United States Patent
Böhm et al.

(10) Patent No.: US 12,424,608 B2
(45) Date of Patent: Sep. 23, 2025

(54) METHOD AND DEVICE FOR PRODUCING A COMPONENT FOR A BATTERY CELL AND SUCH A COMPONENT

(71) Applicant: PowerCo SE, Salzgitter (DE)

(72) Inventors: Dennis Böhm, Wolfenbüttel (DE); Alexander Breuer, Celle (DE); Talia Batres Hermosillo, Braunschweig (DE)

(73) Assignee: PowerCo SE, Salzgitter (DE)

( * ) Notice: Subject to any disclaimer, the term of this patent is extended or adjusted under 35 U.S.C. 154(b) by 595 days.

(21) Appl. No.: 17/708,251

(22) Filed: Mar. 30, 2022

(65) Prior Publication Data
US 2022/0320478 A1    Oct. 6, 2022

(30) Foreign Application Priority Data
Mar. 30, 2021 (DE) .................... 10 2021 108 104.1

(51) Int. Cl.
| | |
|---|---|
| *H01M 4/04* | (2006.01) |
| *H01M 4/02* | (2006.01) |
| *H01M 4/134* | (2010.01) |
| *H01M 4/1395* | (2010.01) |

(52) U.S. Cl.
CPC ......... *H01M 4/043* (2013.01); *H01M 4/0471* (2013.01); *H01M 4/134* (2013.01); *H01M 4/1395* (2013.01); *H01M 2004/021* (2013.01)

(58) Field of Classification Search
None
See application file for complete search history.

(56) References Cited

U.S. PATENT DOCUMENTS

| | | | | |
|---|---|---|---|---|
| 3,860,784 | A | * | 1/1975 | Brown ............... B23K 26/0643 219/121.84 |
| 6,156,452 | A | * | 12/2000 | Kozuki ............... H01M 50/559 429/211 |
| 9,375,804 | B2 | | 6/2016 | Lev |
| 9,634,298 | B2 | | 4/2017 | Harima et al. |
| 9,882,193 | B2 | * | 1/2018 | Choi .................... B23K 20/129 |
| 11,710,879 | B2 | * | 7/2023 | Chen .................... B23K 26/323 228/110.1 |

(Continued)

FOREIGN PATENT DOCUMENTS

| | | |
|---|---|---|
| CN | 102292867 A | 12/2011 |
| CN | 102896416 A | 1/2013 |

(Continued)

OTHER PUBLICATIONS

Jiang et al. (Appl. Sci., vol. 7, 2017, pp. 909 (17 pages)) (Year: 2017).*

(Continued)

*Primary Examiner* — Kevin M Bernatz
(74) *Attorney, Agent, or Firm* — PEARL COHEN ZEDEK LATZER BARATZ LLP

(57) ABSTRACT

A method for manufacturing a component, the component having a multiplicity of cell foils for storing electrical energy that are stacked on top of one another and at least one contact plate, wherein the cell foils form a foil stack in a connection portion, and the foil stack is connected to the contact plate by at least one weld seam for the electrical contacting of the cell foils via the contact plate. Furthermore, a corresponding component and a device for manufacturing such a component are also specified.

10 Claims, 6 Drawing Sheets

(56) References Cited

U.S. PATENT DOCUMENTS

| | | | |
|---|---|---|---|
| 2012/0156542 A1 | 6/2012 | Schaefer et al. | |
| 2012/0276435 A1* | 11/2012 | Hallmark | H01M 10/0585 |
| | | | 429/131 |
| 2013/0029206 A1* | 1/2013 | Lev | H01M 50/522 |
| | | | 429/161 |
| 2020/0067065 A1* | 2/2020 | Breuer | H01M 50/54 |
| 2020/0112015 A1 | 4/2020 | Tao et al. | |
| 2021/0280841 A1* | 9/2021 | Aizawa | H01M 50/538 |
| 2022/0048129 A1 | 2/2022 | Böhm et al. | |
| 2023/0078332 A1* | 3/2023 | Breuer | B23K 26/26 |
| | | | 429/99 |

FOREIGN PATENT DOCUMENTS

| | | |
|---|---|---|
| CN | 111001930 A | 4/2020 |
| CN | 111801812 A | 10/2020 |
| CN | 102473889 A | 5/2025 |
| DE | 10 2012 212 941 A1 | 1/2013 |
| DE | 10 2017 222 490 A1 | 6/2019 |
| DE | 10 2019 102 233 A1 | 6/2020 |
| DE | 102018221843 A1 | 6/2020 |
| JP | 2016-30 280 A | 3/2016 |
| WO | WO 2021/152080 | 8/2021 |

OTHER PUBLICATIONS

Search Report for German Patent Application No. 10 2021 108 104.1, mailed Nov. 12, 2021.
Search Report for European Patent Application No. 22 16 3769, dated Dec. 14, 2022.
Office Action for Chinese Patent Application No. 202210330859.3 dated Mar. 27, 2025.

\* cited by examiner

METHOD AND DEVICE FOR PRODUCING A COMPONENT FOR A BATTERY CELL AND SUCH A COMPONENT

FIELD OF THE INVENTION

The invention relates to a method for manufacturing a component (e.g., for a (Li-ion-)battery cell).

BACKGROUND OF THE INVENTION

The component comprises a multiplicity of cell foils for storing electrical energy that are stacked on top of one another, and at least one contact plate. The cell foils form a foil stack in a connection portion, and the foil stack is connected to the contact plate by at least one weld seam for the electrical contacting of the cell foils via the contact plate. The invention is used particularly in the manufacture of lithium-ion batteries, for example for electrified vehicles.

A battery cell is a power storage means that is used in a motor vehicle, for example, to store electrical energy. In a battery cell, electrode foils (also referred to below as cell foils), i.e., anodes and cathodes, are arranged so as to be stacked one on top of the other, with different electrode foils being arranged so as to be separated from one another by separator foils or a separator material. The electrode foils are arranged in an electrolyte within a housing.

The electrode foils arranged within the housing are connected to an electrical circuit outside the housing via so-called arresters. The arresters extend outward through the gas-tight housing. Inside the housing, the arresters are connected in an electrically conductive manner to the multiplicity of cell foils of the same type, i.e., anodes or cathodes. In this case, an arrester (also referred to below as a contact plate) is connected to a multiplicity of cell foils. The cell foils form a foil stack in a connection portion, and the foil stack is connected to the contact plate by means of a weld joint. This weld joint is generally implemented by laser welding and, in this case, in the form of spot welds.

The component described here comprises, in particular, the electrode foils and the arresters of a battery cell.

In terms of accessibility, heat transfer into the component, and the mechanical stress on the joining partners, laser beam welding is the preferred joining method for the manufacture of lithium-ion cells and batteries. However, the reproducible, error-free manufacture of Cu—Cu, Al—Al, and Al—Cu connections using laser beam welding is severely restricted due to the poor coupling of the laser light at a wavelength of approximately 1050 nm [nanometers] (infrared laser) and the high thermal conductivity of the materials to be welded. Furthermore, copper (Cu) exhibits an absorption edge when the physical state of the material changes from solid to liquid. This erratic behavior causes the Cu melt to suddenly overheat, which in turn leads to the vaporization of the material. As a result, the weld joint has an irregular shape and/or exhibits very heavy spattering. Imperfections occur in the weld joint, which can lead to holes, pores, ejections, spatter, disconnected foils, etc., especially when forming longer weld seams (as opposed to short stitched seams with a weld seam extension of less than 5 millimeters, or spot welds). These errors diminish the quality of the battery cells and increase the risk of failures in the operation of the battery cells.

The process stability required for the creation of such weld joints under large-scale production conditions (e.g., more than 1,000 components per day) has so far only been possible for short weld joints (i.e., stitched seams or spot welds). However, the errors that already occur in that process limit the use of the battery cells manufactured in the abovementioned manner to date.

As cell chemistry performance increases, however (e.g., rapid charging capability of the battery cells), especially with battery cells of the same size, there is a simultaneous rise in the demand placed on the quality and length of the weld joint. This means in particular that integral connections between the foils and the arrester are required which provide a correspondingly large cross-sectional surface area for the transmission of the increased amounts of current.

A need therefore exists to provide a method for producing such weld joints that is suitable for mass production, particularly a method that can be carried out with currently available laser devices, i.e., particularly with laser beams in the infrared range.

A method for manufacturing a composite component by means of laser welding is known from DE 10 2019 102 233 A1. In that method, a portion of the components to be joined by laser welding is arranged in a vacuum chamber, the vacuum chamber covering only a portion of the components in which the weld seam is created, for example.

An ultrasonic welding device for applying an embossed surface into a metal foil stack is known from DE 10 2018 221 843 A1. The metal foils are then welded together near the embossing surface using a laser beam.

Proceeding from this background, it is an object of the invention to resolve, at least in part, the problems described in connection with the prior art. In particular, a method and a device for manufacturing a component are to be specified with which a high-quality weld joint can be implemented.

SUMMARY OF THE INVENTION

These objects are achieved by the features of the independent claim. Additional advantageous embodiments of the solution proposed herein are specified in the dependent claims. It should be pointed out that the features listed individually in the dependent patent claims can be combined with one another in any technologically meaningful manner and define further embodiments of the invention. In addition, the features that are specified in the claims are elucidated in greater detail in the description, where further preferred embodiments of the invention are presented.

What is proposed is a method for manufacturing a component. The component has a multiplicity of cell foils for storing electrical energy that are stacked on top of one another, and at least one contact plate. The cell foils form a foil stack in a connection portion, and the foil stack is connected to the contact plate by at least one weld seam (produced by means of the method) for the electrical contacting of the cell foils via the contact plate.

The component described here comprises, in particular, the electrode foils and the arresters of a battery cell, particularly of a lithium-ion battery cell.

The method for producing the at least one weld seam comprises at least the following steps:
a) providing the cell foils and arranging the foil stack with a stack height;
b) providing the contact plate;
c) compacting at least the film stack by means of a compaction device;
d) arranging the foil stack and the contact plate relative to one another in a connecting position;
e) generating a negative pressure at least in a connecting region of the foil stack and contact plate by means of a vacuum device;

f) connecting the foil stack to the contact plate in the connecting region via the at least one weld seam produced using a laser welding process in the presence of the negative pressure.

The above (non-exhaustive) breakdown of the method steps into a) through f) is primarily intended to serve purposes of distinction and not to impose any order and/or dependency. The frequency of the method steps can vary, for example. It is also possible for method steps to overlap temporally at least in part. Method steps e) and f) very especially preferably take place at least partially in parallel. In particular, step c) is carried out immediately before or immediately after step d). The foil stack is therefore compacted either alone or together with the contact plate. In particular, the negative pressure generated according to step e) is maintained during step f). In particular, steps a) to f) are carried out in the order listed.

The component is particularly suitable for storing electrical energy. The component can be a component for a (rechargeable) lithium-ion battery, for example. In this context, the component can, for example, constitute a component for a (lithium-ion) cell. The component comprises at least one cell stack for storing electrical energy and at least one contact plate for making electrical contact with the at least one cell stack. As a rule, after the connection of cell stack and contact plate as described herein, a plurality of components manufactured in this manner can be connected to form a battery cell. The device may comprise a single cell stack. Furthermore, the component can comprise (exactly) two contact plates (or even more than two).

The method serves particularly to connect the contact plate in an electrically conductive manner to the (respective individual) foil stack, so that the at least one foil stack can be connected to a circuit via the contact plate. The contact plate forms an electrical connector for the component, for example, or an electrical connection element of the component for connecting the component to components external to the component or other components.

According to step a), the cell foils are provided and the foil stack is arranged with a stack height. In particular, the cell foils are provided with a coating (e.g., active material) outside of the respective connection portion, the connection portions (i.e., of each cell foil), which are particularly uncoated, being arranged to form a foil stack with a stack height. In particular, the foil stack comprises at least 10, preferably at least 20, especially preferably at least 30 or even at least 50 or at least 75 cell foils or connection portions. In the connection portion, the cell foils will also be referred to below as foils.

According to step b), the contact plate is provided.

According to step c), the foil stack is compacted by means of a compaction device.

According to step d), the foil stack and the contact plate are arranged relative to one another in a connecting position. In this connecting position, the foil stack and the contact plate are welded to one another in step f). In the process, the foil stack can be arranged on one side of the contact plate or distributed uniformly or differently on both sides of the contact plate.

Optionally, according to step d), the contact plate can already be arranged on the foil stack after step b) and before step c), so that the foil stack and the contact plate are compacted according to step c).

As a result of the compaction, air is displaced from the foil stack or between the foil stack and the contact plate. Otherwise, this air can lead to defects or flaws in the weld seam, particularly during step f). The compacting takes place particularly by applying a pressure to the foil stack and, if necessary, to the contact plate as well, which is superposed with an ultrasonic excitation. By means of the ultrasonic excitation, the individual components are shifted and moved at least relative to one another, so that air is successively displaced.

The pressure with which the compaction device acts on the component is between 0.75 and 2 bar, particularly at the point of contact between the compaction device and the component (i.e., the foil stack or possibly the contact plate).

The ultrasonic excitation comprises particularly an oscillation transverse to the joining plane between the foils of the foil stack or the contact plate and/or an oscillation parallel to the joining plane. The frequency is preferably 20 kHz [kilohertz], preferably no more than 40 kHz. The frequency is particularly at least 6 kHz. The amplitude of the ultrasonic excitation at the contact between the ultrasonic device and the component is particularly no more than 60 μm [microns], preferably no more than 20 μm.

In particular, an integral connection between the foils of the foil stack and possibly the contact plate does not take place during compacting. In particular, the foils and possibly the contact plate are connected to one another in a form-fitting manner as a result of the ultrasonic excitation, however, because the surfaces that are arranged against one another form the smallest of such connections with one another.

The foils of the foil stack and possibly the contact plate are preferably connected to one another at least partially in an integral manner as a result of the compacting.

According to step e), a negative pressure is generated by a vacuum device at least in a connecting region of the foil stack and contact plate. The vacuum device is used to remove air particularly from the vicinity of the weld seam that is to be produced.

According to step f), the foil stack is connected to the contact plate in the connecting region by means of at least one weld seam produced using a laser welding process in the presence of the negative pressure, particularly a spot weld, stitch weld, or linear weld. In particular, the weld seam has a length along a welding direction of at least 5 millimeters, preferably at least 10 millimeters, especially preferably at least 50 millimeters.

In particular, the laser beam is coupled in via the contact plate or via the foil stack. The coupling preferably occurs via the foil stack, so that the connecting of the contact plate takes place only via the foil stack.

Due to the high quality of the weld seam that can be produced by the proposed method, the root of a weld seam can also be arranged on a foil of the foil stack.

In particular, a foil and not the contact plate is arranged on the side of the connecting region facing away from the laser source.

In particular, the components that were connected to one another through compaction in step c) (foils and possibly contact plate) are fixed in the connecting position by a holding device at least up to step e), preferably also up to step f). This is particularly intended to prevent the connections created through compaction between individual components from coming undone (again) as a result of transporting the component. The holding device is used particularly for the clamping of these components.

In particular, the weld seam is arranged exclusively in the vicinity of the foil stack or of the contact plate in which the connection was produced through compaction in step c).

In relation to the present invention, it has been shown for the first time that a high-quality weld seam can only be produced through a combination of the steps of c) compacting and e) generating a negative pressure. In particular, certain quality characteristics of the weld seam have been able to be produced for the first time.

Particularly, the vacuum device comprises at least one chamber in which at least the foil stack and the contact plate are arranged. By arranging the foil stack and the contact plate in the chamber, air can also be removed from the regions between the foils of the foil stack and/or between the foil stack and the contact plate. However, the volume of the chamber is quite large, and large amounts of air have to be removed, possibly for each component.

In particular, the vacuum device comprises a first device part and a second device part, each of which forms a sealing surface with at least the foil stack or the contact plate. The vacuum device thus forms at least two chambers, in each of which at least one negative pressure is generated. Each chamber is at least partially formed at least by the foil stack or by the contact plate.

In this embodiment of the vacuum device, the regions between the foils or between the foil stack and the contact plate are arranged outside of the vacuum device. As a result of the compacting of the foil stack and possibly of the contact plate, however, air can be removed from these regions to such an extent that the quality of the weld joint is not impaired. The volume of the respective device part can be made very small, so that only a small amount of air has to be removed.

The respective sealing surface is particularly arranged completely on the foil stack and/or contact plate and thus covers a surface portion that is designed to be as small as possible in consideration of the position and the length of the weld joint.

In particular, the foil stack is formed by a multiplicity of foils that are arranged one on top of the other, each foil having a first thickness and the stacked foils with the respective first thickness forming the stack height. The first thickness is between 4 and 30 µm [microns], and each foil of the foil stack comprises at least 99.0% by weight of either copper or aluminum. In particular, the first thickness is between 4 µm and 15 µm, preferably no more than 10 µm.

In particular, each foil comprises no more than 0.5% by weight of oxygen, preferably no more than 0.1% by weight.

In particular, the stack height is formed by at least ten foils stacked on top of one another. In particular, the foil stack comprises at least 10, preferably at least 20, especially preferably at least 30 cell foils or connection portions.

In particular, the contact plate in the connecting region has a second thickness that is between 0.2 and 3 millimeters and comprises at least 99.0% by weight of either copper or aluminum. In particular, the second thickness is between 20 µm and 1 (one) millimeter, preferably between 50 µm and 500 µm.

In particular, the contact plate comprises no more than 0.5% by weight of oxygen, preferably no more than 0.1% by weight.

In particular, the contact plate has a coating which has a third thickness of no more than 2 µm and comprises at least 99.0% by weight of nickel. The third thickness is particularly at least 0.1 µm.

In particular, the negative pressure in the connecting region and/or in each chamber is less than 30 mbar [millibar], preferably less than 20 mbar, especially preferably less than 10 mbar. In particular, the negative pressure can be more than 5 mbar.

In particular, the at least one weld seam is produced on the component by a laser beam with a wavelength of between 1,030 and 1,060 nm [nanometers].

In particular, the at least one weld seam is produced on the component by a laser beam with a wavelength of between 490 and 575 nm [nanometers] or even between 405 and 490 nm.

In particular, a component is proposed which comprises at least a multiplicity of cell foils for storing electrical energy that are stacked on top of one another, and at least one contact plate. The cell foils form a foil stack in a connection portion, and the foil stack is connected to the contact plate by at least one weld seam in a butt joint or lap joint. The at least one weld seam is produced by the described method. The weld seam extends along a weld direction over a length and has a cross section transverse to the weld direction. The component has a first material thickness in the cross section and immediately adjacent to the weld seam, and all of the following conditions apply to at least 30% of the cross sections that exist along the weld seam:

if the foil stack and the contact plate each comprise at least 99.0% copper:
a minimum second material thickness of the weld seam is at least 70%, particularly at least 80%, preferably at least 90%, of the first material thickness;
a pore has a maximum diameter of no more than 0.02 millimeters, in particular no more than 0.01 millimeters;
a porosity of the weld seam is no more than 20%, in particular no more than 10%, preferably no more than 5%, especially preferably no more than 2%;

if the foil stack and the contact plate each comprise at least 99.0% aluminum:
a minimum second material thickness of the weld seam is at least 80% of the first material thickness, in particular at least 90%, preferably at least 95%;
a pore has a maximum diameter of no more than 0.04 millimeters, in particular no more than 0.02 millimeters, preferably no more than 0.01 millimeters;
a porosity of the weld seam is no more than 20%, in particular no more than 10%, preferably no more than 5%, especially preferably no more than 2%;
at least 50%, preferably at least 75%, especially preferably at least 85% or even at least 95% of the foils in the foil stack are attached to the weld seam.

The first material thickness particularly includes the foil stack or the contact plate (in the case of a butt joint) or the foil stack and the contact plate (in the case of a lap joint) or the thickness thereof, with only the material of the component of the first material thickness being added (without intervening free spaces or air). In the case of a butt joint, the components to be connected to one another via the weld seam are arranged in a known manner with opposite end faces so that they contact one another or are spaced apart from one another by a welding gap. In the case of a lap joint, the components to be connected via the weld seam are arranged one on top of the other, and the weld seam penetrates the component that is arranged at the top (toward the beam source) down to the bottom component. In particular, the contact plate is arranged on the bottom side in the case of the lap joint.

The minimum second material thickness is particularly the smallest extension of the weld seam in the cross section along the direction of the thickness, more particularly of the material thickness. Pores—i.e., air or gas inclusions—are included in the second material thickness.

Each cross section here extends transversely to the welding direction and parallel to the material thickness or thickness of the respective component. The cross section thus runs perpendicularly to the respective largest side surface of the components. The cross section can be evaluated using standard cross sections of the weld seam. In particular, an at least 100-fold, preferably at least 500-fold, especially preferably at least 1,000-fold enlargement of the cross section should be observed.

In particular, if the foil stack and the contact plate each comprise at least 99.0% copper, at least one, preferably at least two, or even at least three of the following conditions also apply:
- in the case of the lap joint, a (shortest) connecting line (through the weld seam) between the foil stack and the contact plate (or along the dividing line between the foil stack and the contact plate) is free of pores (parting line less than 1% porosity);
- the first material thickness is at least one millimeter, preferably at least 1.5 millimeters, and a superelevation of a root of the weld seam is no more than 0.04 millimeters, preferably no more than 0.02 millimeters;
- the first material thickness is at least one millimeter, preferably at least 1.5 millimeters, and an arch under a root of the weld seam is no more than 0.1 millimeters, preferably no more than 0.05 millimeters;
- the first material thickness is at least one millimeter, preferably at least 1.5 millimeters, and a superelevation of a cover pass of the weld seam is no more than 0.02 millimeters, preferably no more than 0.01 millimeters;
- the first material thickness is at least one millimeter, preferably at least 1.5 millimeters, and a concavity of a cover pass of the weld seam is no more than 0.06 millimeters, preferably no more than 0.03 millimeters;
- the weld seam is at least free of cracks or edge notches or root concavities;
- at least 50%, preferably at least 75%, especially preferably at least 85% or even at least 95% of the foils in the foil stack are attached to the weld seam.

In particular, if the foil stack and the contact plate each comprise at least 99.0% aluminum, at least one, preferably at least two, or even at least three of the following conditions also apply:
- in the case of the lap joint, a line connecting the foil stack and the contact plate is free of pores (particularly with less than 1% porosity);
- the first material thickness is at least one millimeter, preferably at least 1.5 millimeters, and a superelevation of a root of the weld seam is no more than 0.07 millimeters, preferably no more than 0.03 millimeters;
- the first material thickness is at least one millimeter, preferably at least 1.5 millimeters, and an arch under a root of the weld seam is no more than 0.05 millimeters, preferably no more than 0.02 millimeters;
- the first material thickness is at least one millimeter, preferably at least 1.5 millimeters, and a superelevation of a cover pass of the weld seam is no more than 0.02 millimeters, preferably no more than 0.01 millimeters;
- the first material thickness is at least one millimeter, preferably at least 1.5 millimeters, and a concavity of a cover pass of the weld seam is no more than 0.02 millimeters, preferably no more than 0.01 millimeters;
- the weld seam is at least free of cracks or edge notches or root concavities.

A superelevation of a root is, in particular, an overhang of the weld seam in the observed cross section relative to an imaginary straight line between the respective bottom sides of the components that are directly adjacent to the weld seam (i.e., oriented away from the beam source) and connected by the weld seam.

A concavity of a root is, in particular, a depression of the weld seam in the observed cross section relative to an imaginary straight line between the respective bottom side of the components that are directly adjacent to the weld seam and connected by the same.

A superelevation of a cover pass is, in particular, an overhang of the weld seam in the observed cross section relative to an imaginary straight line between the respective top sides of the components that are directly adjacent to the weld seam (i.e., oriented toward the beam source) and connected by the weld seam.

A concavity of a cover pass is, in particular, a depression of the weld seam in the observed cross section relative to an imaginary straight line between the respective top side of the components that are directly adjacent to the weld seam and connected by the same.

Crack-free means in particular that no cracks, i.e., gaps, are visible or present within the material of the weld seam in the observed cross section.

Edge notches are, in particular, concavities in the transition between the weld seam and the top side of the component.

Root concavities are, in particular, concavities in the transition between the weld seam and the bottom side of the component.

Also proposed is a device for manufacturing a component having a multiplicity of cell foils for storing electrical energy that are stacked on top of one another, and at least one contact plate. The cell foils form a foil stack in a connection portion, and the foil stack is connected to the contact plate by at least one weld seam for the electrical contacting of the cell foils via the contact plate. The device is appropriately designed for carrying out the described method and, for the purpose of producing the at least one weld seam, comprises at least
- one compaction device for compacting at least the foil stack,
- one vacuum device for generating a negative pressure at least in a connecting region of the foil stack and contact plate, and
- one laser device for connecting the foil stack to the contact plate in the connecting region via at least one weld seam produced using a laser welding process in the presence of the negative pressure.

The device is used particularly to carry out the method described herein and/or to manufacture the component described herein and is set up appropriately. For example, the vacuum device can comprise at least one vacuum or negative pressure connection—per chamber, for example—and/or at least one vacuum pump.

The laser device can comprise at least one laser source, particularly an infrared laser source.

The details, features, and advantageous embodiments discussed in connection with the method can also occur analogously in the component and/or device presented herein, and vice versa. In this respect, reference is made to the specifications provided therein in their entirety for a more detailed characterization of the features.

Particularly in the claims and in the description that describes them, the indefinite articles ("a" and "an") are to be understood as such and not as quantifiers. Accordingly, terms and components that are introduced therewith are thus to be understood as being present at least singly but particularly also possibly in a plurality.

By way of precaution, it should be noted that the number words used here ("first," "second," . . . ) serve primarily (only) to distinguish a plurality of similar objects, quantities, or processes; that is, they do not prescribe any dependency and/or order of these objects, quantities, or processes relative to one another. Should a dependency and/or order be required, this is explicitly stated herein or it obviously follows for a person skilled in the art when studying the embodiment specifically described. If a component can occur multiple times ("at least one"), the description of one of these components can apply equally to all or a portion of the plurality of these components, but this is not necessarily the case.

BRIEF DESCRIPTION OF THE DRAWINGS

The invention and the technical environment will be explained in greater detail with reference to the enclosed figures. It should be noted that the invention is not intended to be limited by the specified embodiments. In particular, unless explicitly stated otherwise, it is also possible to extract partial aspects of the features explained in the figures and to combine them with other components and insights from the present description. In particular, it should be pointed out that the figures and, in particular, the illustrated proportions are only schematic. In the drawing.

DETAILED DESCRIPTION OF THE INVENTION

Figure 1:
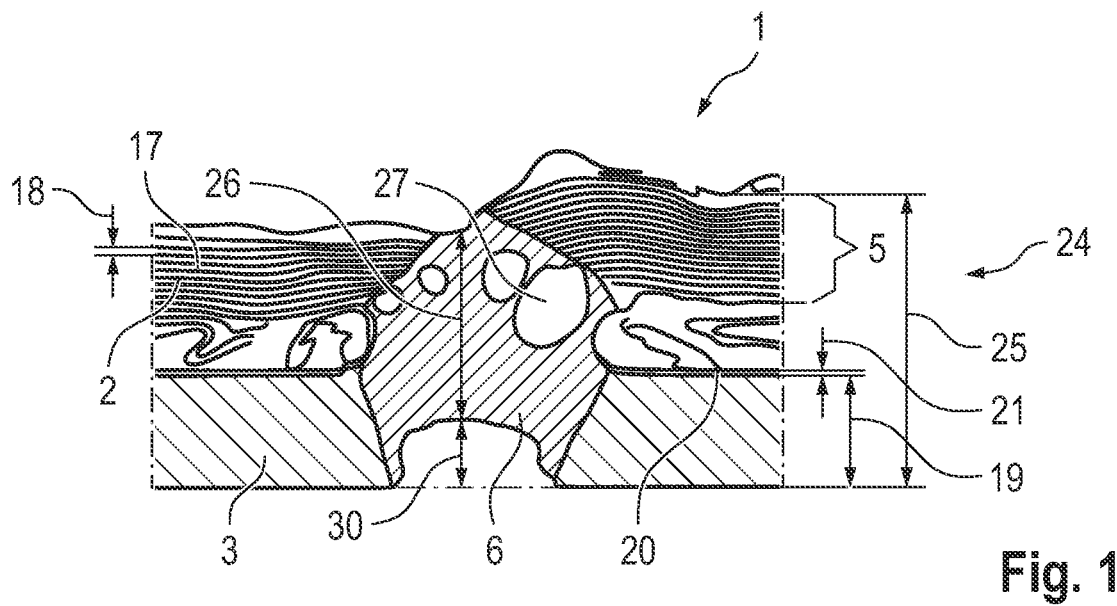
FIG. 1 shows a cross section through a weld seam that was produced by a known method, in section.

FIG. 1 shows a cross section 24 through a weld seam 6 that was produced by a known method, in section. The component 1 comprises a contact plate 3 with a second thickness 19 and a foil stack 5, which form a lap joint. The foil stack 5 forms a top side and is oriented toward the beam source. The weld seam 6 comprises large pores 27, high porosity, and a pronounced concavity 30 of the root of the weld seam 6. The second material thickness 26 is substantially less than the first material thickness 25.

The first material thickness 25 is only implied here, since the air or free spaces are to be deducted in determining the first material thickness.

The material of the foils 17 of the foil stack 5 and the material of the contact plate 3 each comprise at least 99.0% aluminum. Each of the foils 17 has a first thickness 18.

A coating 20 of the contact plate 3 with a third thickness 21 is only implied here.

Figure 2:
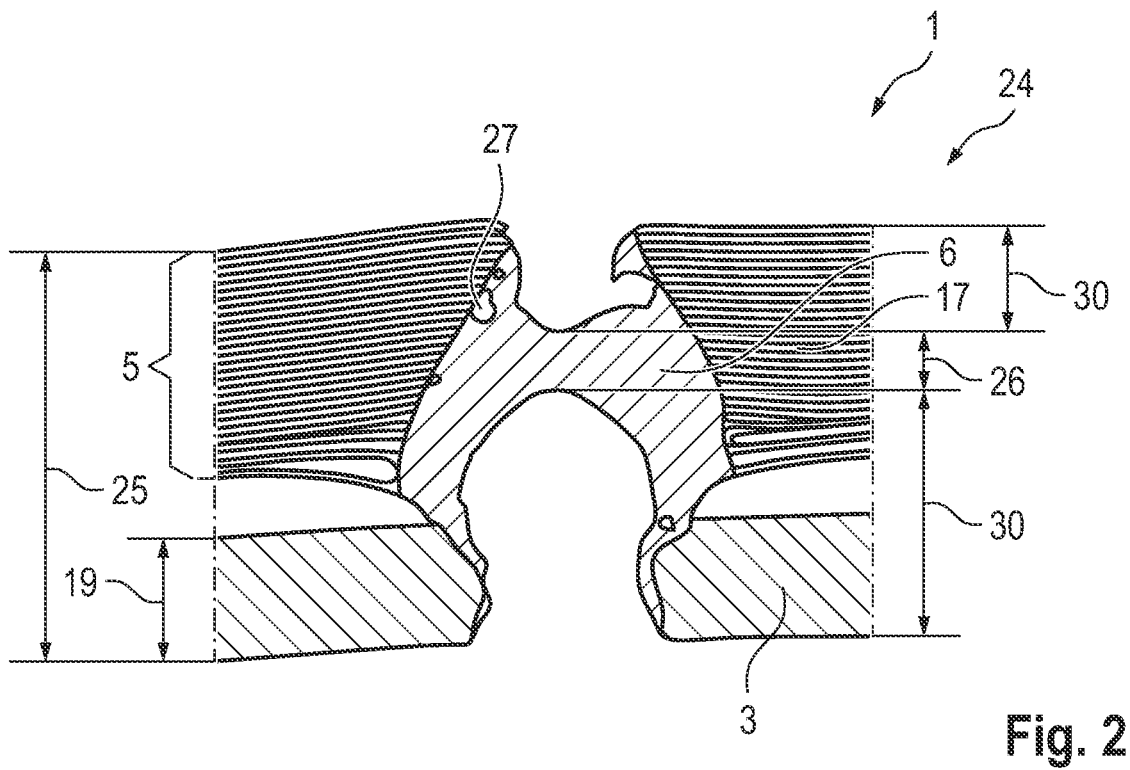
FIG. 2 shows a cross section through another weld seam that was produced by a known method, in section.

FIG. 2 shows a cross section 24 through another weld seam 6 that was produced by a known method, in section. The component 1 comprises a contact plate 3 and a foil stack 5, which form a lap joint. The foil stack 5 forms a top side and is oriented toward the beam source. The weld seam 6 comprises large pores 27, a high level of porosity, and a pronounced concavity 30 of the root (on the bottom side of the component 1) and the cover pass (on the top side of the component 1) of the weld seam 6. The second material thickness 26 is substantially less than the first material thickness 25. Only a small number of the foils 2 are connected to the contact plate 3 via the weld seam 6.

The first material thickness 25 is only implied here, since the air or free spaces are to be deducted in determining the first material thickness.

The material of the foils 17 of the foil stack 5 and the material of the contact plate 3 each comprise at least 99.0% copper. Each of the foils 17 has a first thickness 18.

Figure 3:
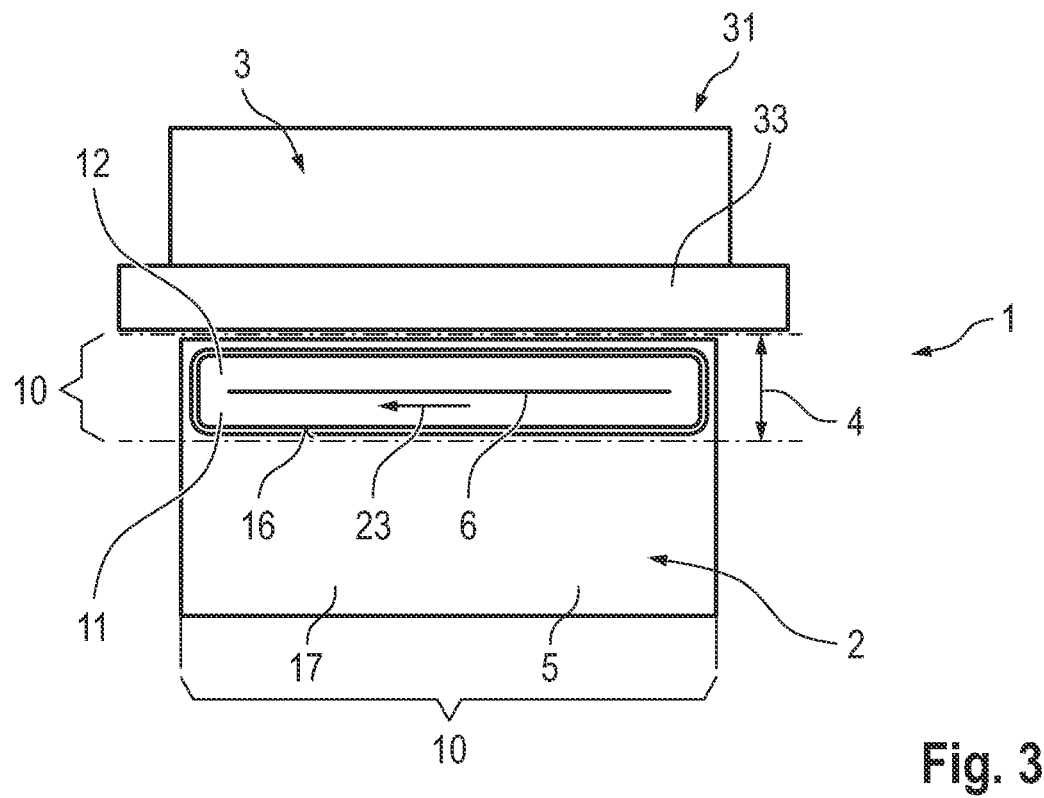
FIG. 3 shows a first design variant of a device with a component in a plan view according to steps e) and f)
Figure 4:
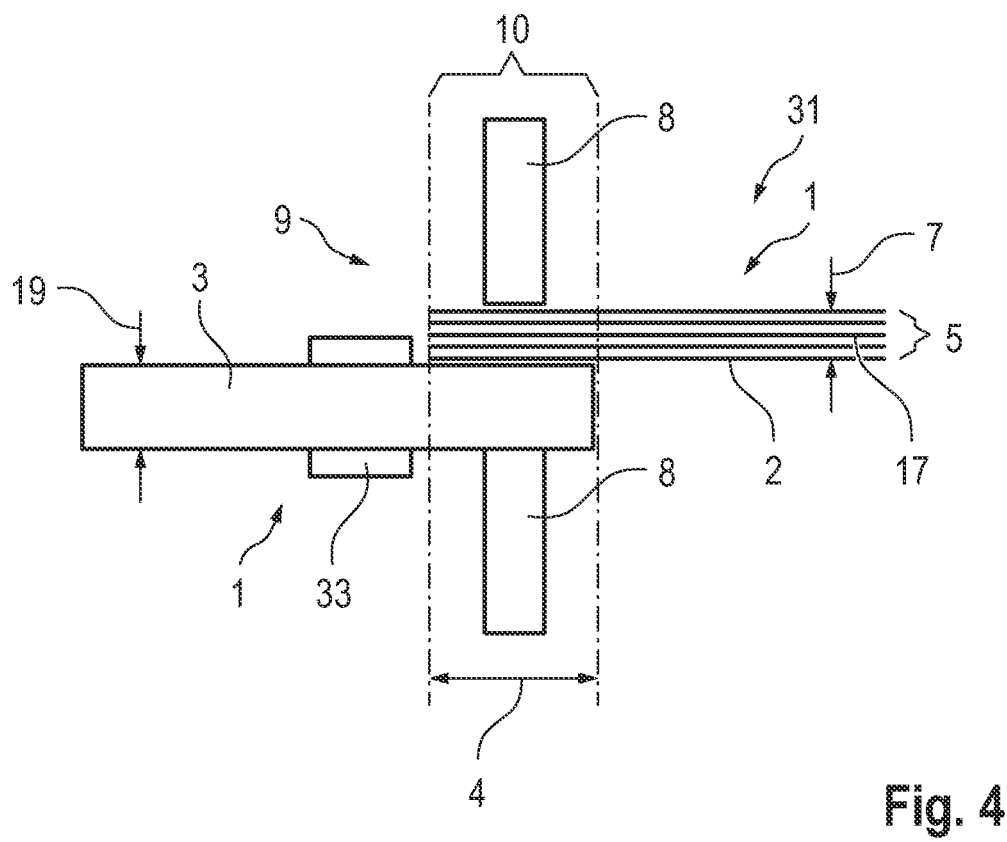
FIG. 4 shows the device according to FIG. 3 according to step c) in a side view.
Figure 5:
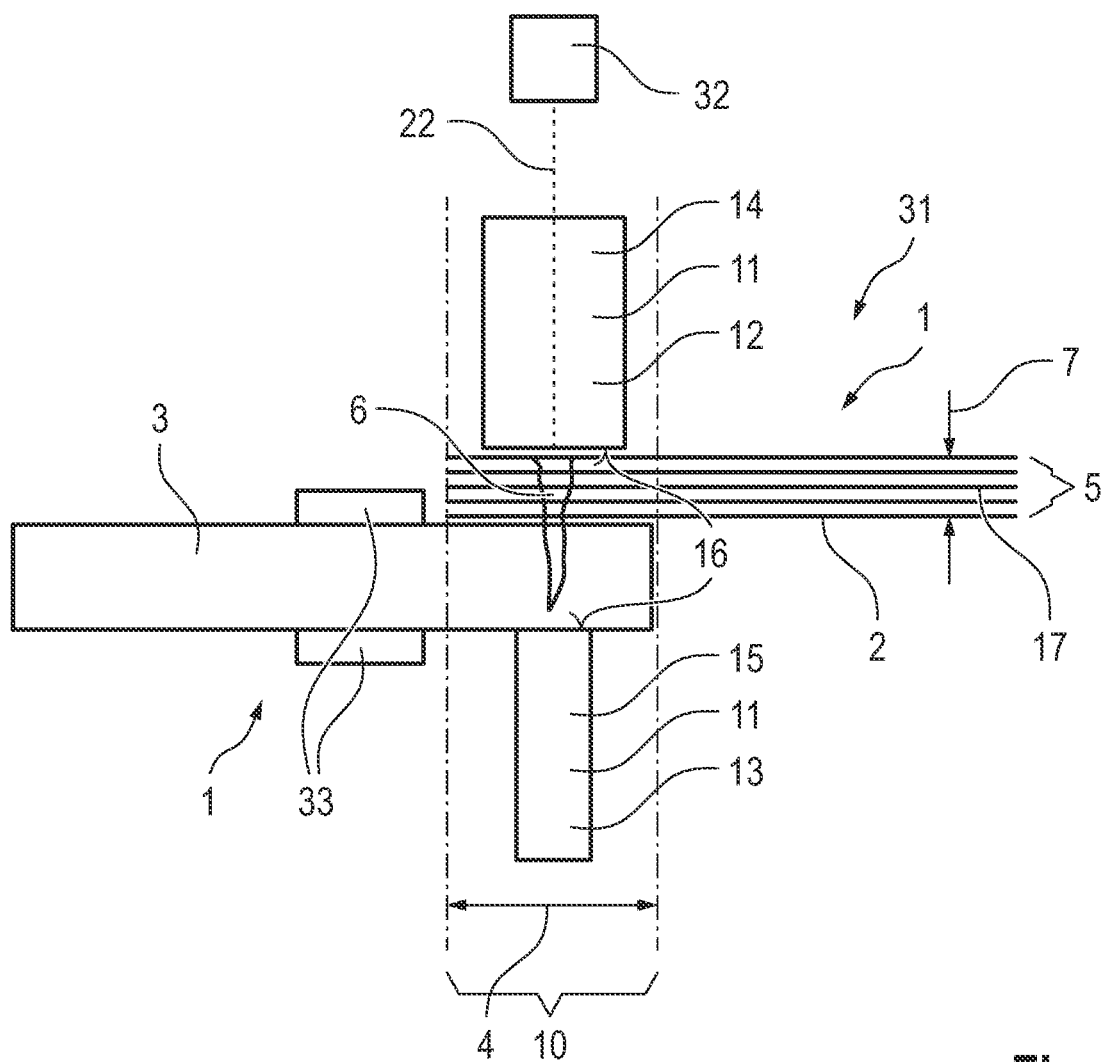
FIG. 5 shows the device according to FIG. 3 according to steps e) and f) in a side view.

FIG. 3 shows a first design variant of a device 31 with a component 1 in a plan view according to steps e) and f). FIG. 4 shows the device 31 of FIG. 3 according to step c) in a plan view. FIG. 5 shows the device 31 of FIG. 3 according to steps c) and f) in a side view. FIGS. 3 to 5 are described together below.

The component 1 has a multiplicity of cell foils 2 stacked on top of one another for storing electrical energy and at least one contact plate 3. The cell foils 2 form a foil stack 5 in a connection portion 4, and the foil stack 5 is connected to the contact plate 3 by a weld seam 6 for the electrical contacting of the cell foils 2 via the contact plate 3. The weld seam 6 is arranged adjacent to a sealed seam 33 of the battery cell by means of which the housing of the battery cell is sealed. The weld seam 6 is later arranged within the housing of the battery cell, so that the contact plate 3 extends from the weld seam 6 via the sealed seam 33 to the outside of the housing.

The device 31 is appropriately designed for carrying out the described method and comprises, for the purpose of producing the at least one weld seam 6, a compaction device 8 for compacting at least the foil stack 5, a vacuum device 11 for generating a negative pressure at least in a connecting region 10 of the foil stack 5 and contact plate 3, and a laser device 32 for connecting the foil stack 5 to the contact plate 3 in the connecting region 10 via at least one weld seam 6 produced using a laser welding process in the presence of the negative pressure.

The method serves to connect the contact plate 3 in an electrically conductive manner to the foil stack 5 so that the foil stack 5 can be connected to a circuit via the contact plate 3. The contact plate 3 forms an electrical connection of the component 1 or an electrical connection element of the component 1 for connecting the component 1 to external components or other components 1.

According to step a), the cell foils 2 are provided and the foil stack 5 is arranged with a stack height 7. The contact plate 3 is provided according to step b). The contact plate 3 and the foil stack 5 are arranged in a connecting position 9 (for a lap joint in this case) according to step d). According to step c), the foil stack 5 and the contact plate 3 are compacted by means of a compaction device 8 (see FIG. 4). In this connecting position 9, the foil stack 5 and the contact plate 3 are welded to one another in step f) by applying the laser beam 22 to the connecting region 10.

The compacting takes place by applying a pressure to the foil stack 5 and also to the contact plate 3, which is superposed with an ultrasonic excitation (FIG. 4). By means of the ultrasonic excitation, the individual components 2, 3, 5, 17 are shifted and moved at least relative to one another, so that air is successively displaced.

According to step e), a negative pressure is generated by a vacuum device 11 in a connection region 10 of the foil stack 5 and contact plate 3. The vacuum device 11 is used to remove air from the vicinity of the weld seam 6 that is to be produced (see FIGS. 5 and 6).

The vacuum device 11 comprises a first device part 14 and a second device part 15, each of which forms a sealing surface 16 with the foil stack 5 or the contact plate 3. The vacuum device 11 thus forms two chambers 12, 13, in each of which at least one negative pressure is generated. The first chamber 12 is formed by the first device part 14 and the foil stack 5, and the second chamber 13 is formed by the second device part 15 and the contact plate 3.

In this embodiment of the vacuum device 11, the regions between the foils 17 or between the foil stack 5 and the contact plate 3 are arranged outside of the vacuum device 11. As a result of the compacting of the foil stack 5 and the contact plate 3, however, air can be removed from these regions to such an extent that the quality of the weld joint is not impaired. The volume of the respective device part 14, 15 can be made very small, so that only a small amount of air has to be removed.

The respective sealing surface 16 is arranged completely on the foil stack 5 or on the contact plate 3 and thus comprises a surface portion that is designed to be as small as possible in consideration of the position and the length of the weld seam 6.

According to step f), the foil stack 5 is connected to the contact plate 3 in the connecting region 10 via a weld seam 6 that is produced using a laser welding process in the presence of the negative pressure. In particular, the weld seam 6 has a length along a welding direction 23.

Figure 6:
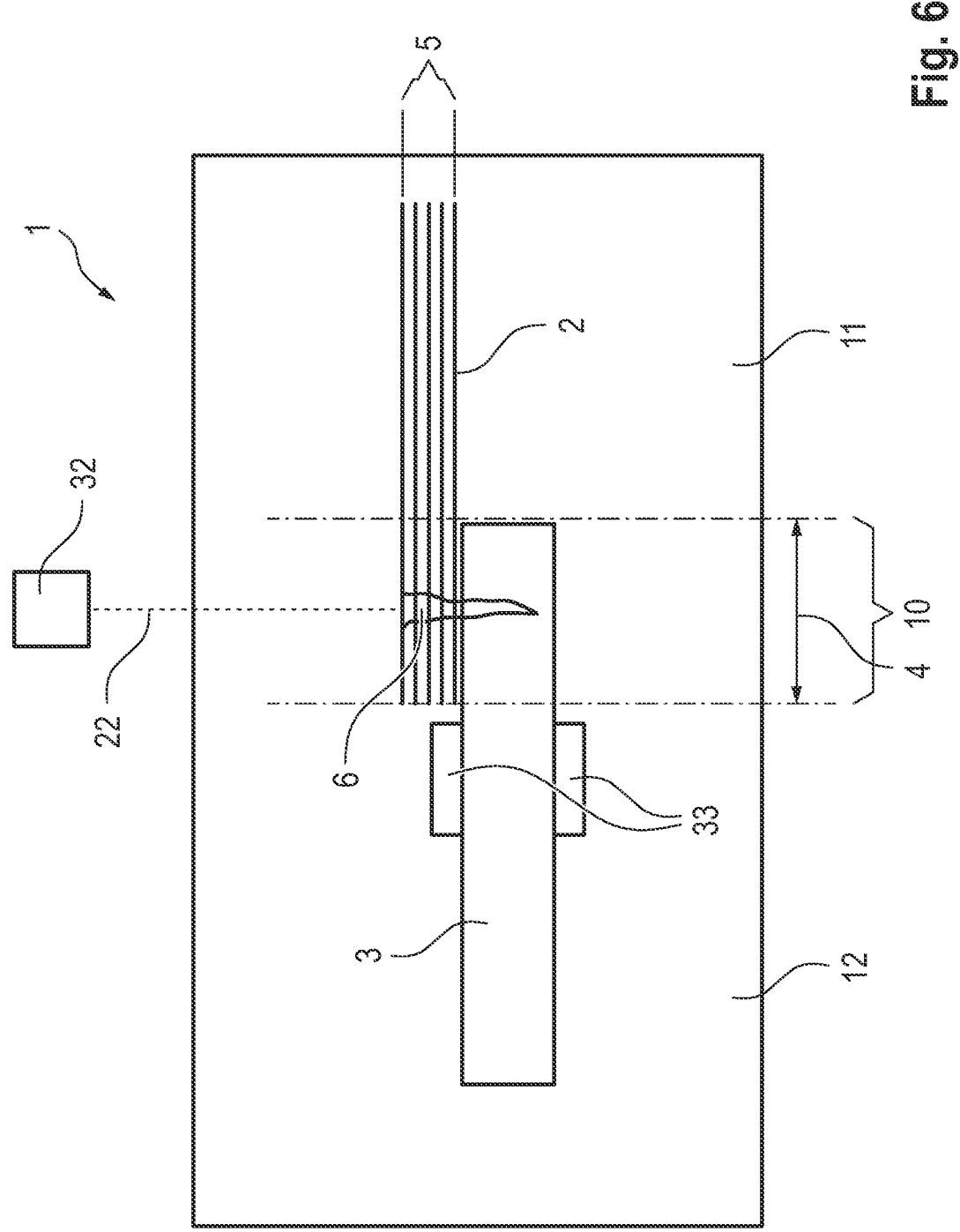
FIG. 6 shows a second embodiment of a device according to steps e) and f) in a side view.

FIG. 6 shows a second design variant of a device 31 according to steps e) and f) in a side view. In contrast to the first design variant, the vacuum device 11 comprises only one chamber 12, in which the foil stack 5 and the contact plate 3 are arranged. By arranging the foil stack 5 and the contact plate 3 in the chamber 12, air can possibly also be removed from the regions between the foils 17 of the foil stack 5 or between the foil stack 5 and the contact plate 3. However, the volume of the chamber 12 is quite large, and large amounts of air have to be removed, possibly for each component 1.

Figure 7:
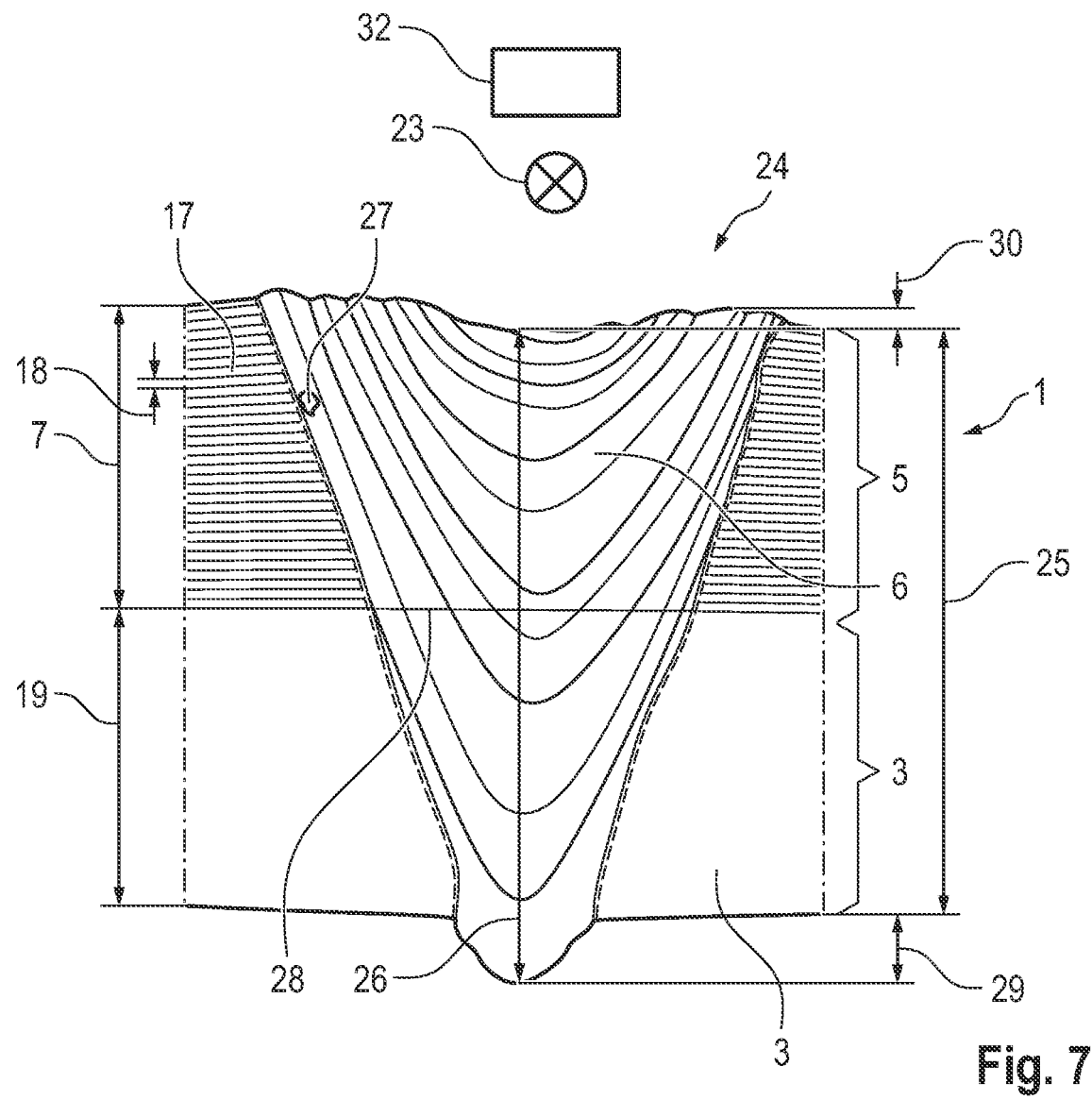
FIG. 7 shows a cross section through a weld seam produced by the described method, in section.

FIG. 7 shows a cross section 24 through a weld seam 6 that was produced by the described method, in section.

The component 1 comprises a contact plate 3 with a second thickness 19 and a foil stack 5, which form a lap joint. The foil stack 5 forms a top side and is oriented toward the beam source (the laser device 32). The weld seam 6 has almost no pores 27 and hence a low porosity, a slight superelevation 29 of the root, and a slight concavity 30 of the cover pass of the weld seam 6. The second material thickness 26 is even greater than the first material thickness 25.

In the lap joint shown, the material of the weld seam 6 is non-porous along a shortest connecting line 28 through the weld seam 6 between the foil stack 5 and the contact plate 3 or along the dividing line between the foil stack 5 and the contact plate 3. All of the foils 17 of the foil stack 5 are connected to the weld seam 6.

The weld seam 6 is free of cracks, edge notches, and root concavities.

The material of the foils 17 of the foil stack 5 and the material of the contact plate 3 each comprise at least 99.0% aluminum. Each of the foils 17 has a first thickness 18.

Figure 8:
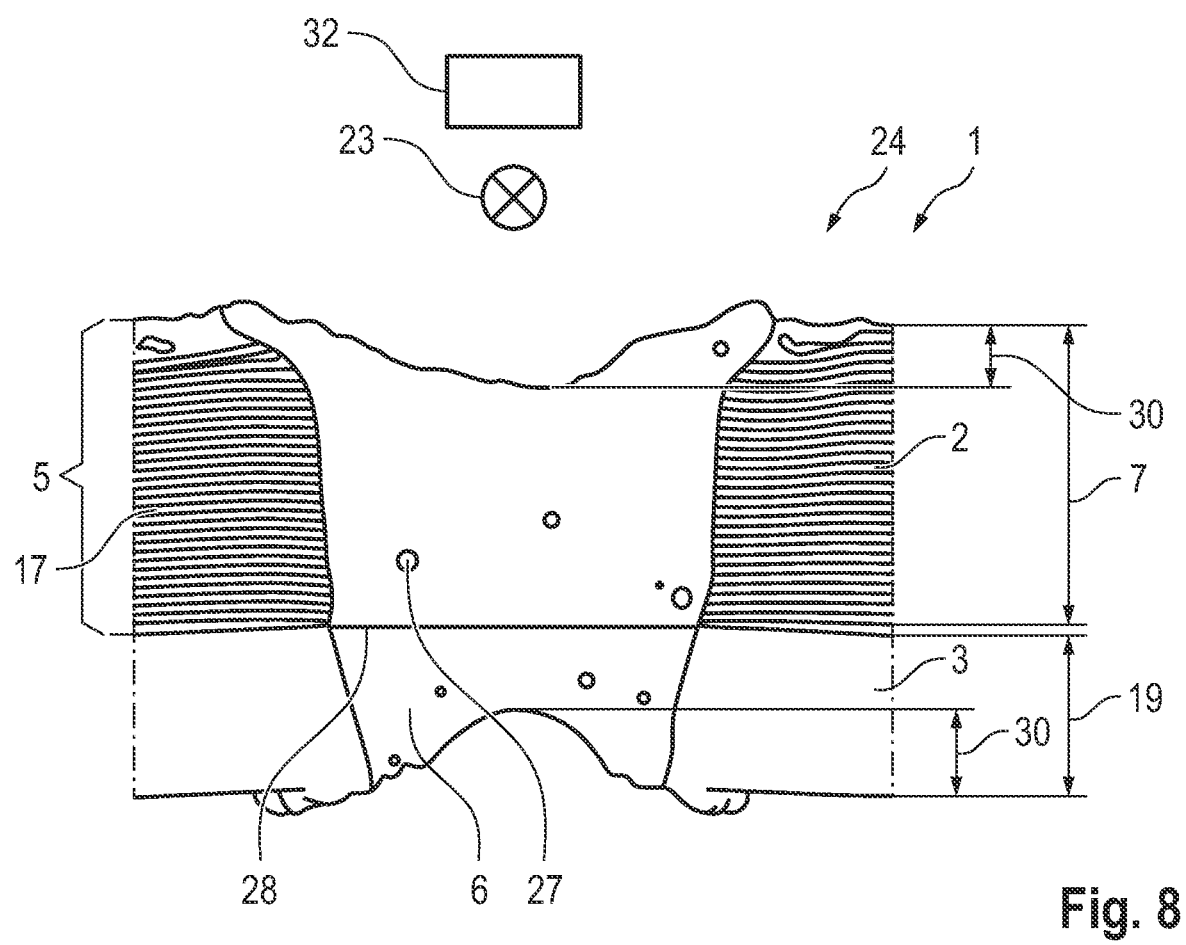
FIG. 8 shows a cross section through another weld seam that was produced by the described method, in section.

FIG. 8 shows a cross section 24 through another weld seam 6 that was produced by the described method, in section.

The component 1 comprises a contact plate 3 with a second thickness 19 and a foil stack 5, which form a lap joint. The foil stack 5 forms a top side and is oriented toward the beam source (the laser device 32). The weld seam 6 has only very small pores 27 and hence a low porosity, a slight concavity 30 of the root, and a slight concavity 30 of the cover pass of the weld seam 6. The second material thickness 26 is only slightly less than the first material thickness 25.

In the lap joint shown, the material of the weld seam 6 is non-porous along a shortest connecting line 28 through the weld seam 6 between the foil stack 5 and the contact plate 3 or along the dividing line between the foil stack 5 and the contact plate 3. All of the foils 17 of the foil stack 5 are connected to the weld seam 6.

The weld seam 6 is free of cracks, edge notches, and root concavities.

The material of the foils 17 of the foil stack 5 and the material of the contact plate 3 each comprise at least 99.0% aluminum. Each of the foils 17 has a first thickness 18.

LIST OF REFERENCE SYMBOLS 1 component
2 cell foil
3 contact plate
4 connection portion
5 foil stack
6 weld seam
7 stack height
8 compaction device
9 connecting position
10 connecting region
11 vacuum device
12 first chamber
13 second chamber
14 first device part
15 second device part
16 sealing surface
17 foil
18 first thickness
19 second thickness
20 coating
21 third thickness
22 laser beam
23 welding direction
24 cross section
25 first material thickness
26 second material thickness
27 pore
28 connecting line
29 superelevation
30 concavity
31 device
32 laser device
33 sealed seam

The invention claimed is:

1. A method for manufacturing a component, the component having a multiplicity of cell foils stacked on top of one another for storing electrical energy and at least one contact plate, wherein the cell foils form a foil stack in a connection portion, and the foil stack is connected to the contact plate by at least one weld seam for the electrical contacting of the cell foils via the contact plate, wherein the method for producing the at least one weld seam comprises at least the following steps:

providing the cell foils, and arranging the foil stack with a stack height;
providing the contact plate;

compacting at least the foil stack by means of a compaction device, wherein the compacting takes place by applying a pressure to the foil stack, which is superposed with an ultrasonic excitation;

arranging the foil stack and the contact plate relative to one another in a connecting position;

generating a negative pressure at least in a connecting region of the foil stack and contact plate by means of a vacuum device;

connecting the foil stack to the contact plate in the connecting region via the at least one weld seam produced using a laser welding process in the presence of the negative pressure.

2. The method as set forth in claim 1, wherein the vacuum device comprises at least one chamber in which at least the foil stack and the contact plate are arranged.

3. A method for manufacturing a component, the component having a multiplicity of cell foils stacked on top of one another for storing electrical energy and at least one contact plate, wherein the cell foils form a foil stack in a connection portion, and the foil stack is connected to the contact plate by at least one weld seam for the electrical contacting of the cell foils via the contact plate, wherein the method for producing the at least one weld seam comprises at least the following steps:

providing the cell foils, and arranging the foil stack with a stack height;

providing the contact plate;

compacting at least the foil stack by means of a compaction device;

arranging the foil stack and the contact plate relative to one another in a connecting position;

generating a negative pressure at least in a connecting region of the foil stack and contact plate by means of a vacuum device, wherein the vacuum device comprises a first device part and a second device part, each of which forms a sealing surface with at least the foil stack or the contact plate, so that the vacuum device forms at least two chambers, in each of which at least one negative pressure is generated, and each chamber being formed at least partially at least by the foil stack or by the contact plate;

connecting the foil stack to the contact plate in the connecting region via the at least one weld seam produced using a laser welding process in the presence of the negative pressure.

4. The method as set forth in claim 1, wherein the foil stack is formed by a plurality of foils arranged one on top of the other, wherein each foil has a first thickness, and the foils that are stacked on top of one another having the respective first thickness form the stack height, and wherein the first thickness is between 4 and 30 μm and each foil of the foil stack comprises at least 99.0% by weight of either copper or aluminum.

5. The method as set forth in claim 1, wherein the stack height is formed by at least ten foils stacked on top of one another.

6. The method as set forth in claim 1, wherein the contact plate in the connecting region has a second thickness of between 0.2 and 3 millimeters and comprises at least 99.0% by weight of either copper or aluminum.

7. The method as set forth in claim 1, wherein the contact plate has a coating which has a third thickness of no more than 2 μm and which comprises at least 99.0% by weight of nickel.

8. A method for manufacturing a component, the component having a multiplicity of cell foils stacked on top of one another for storing electrical energy and at least one contact plate, wherein the cell foils form a foil stack in a connection portion, and the foil stack is connected to the contact plate by at least one weld seam for the electrical contacting of the cell foils via the contact plate, wherein the method for producing the at least one weld seam comprises at least the following steps:

providing the cell foils, and arranging the foil stack with a stack height;

providing the contact plate;

compacting at least the foil stack by means of a compaction device;

arranging the foil stack and the contact plate relative to one another in a connecting position;

generating a negative pressure at least in a connecting region of the foil stack and contact plate by means of a vacuum device;

connecting the foil stack to the contact plate in the connecting region via the at least one weld seam produced using a laser welding process in the presence of the negative pressure, wherein the negative pressure in the connecting region is less than 30 mbar.

9. The method as set forth in claim 1, wherein the at least one weld seam is produced by a laser beam with a wavelength of between 405 and 575 nm.

10. A device for manufacturing a component, the component having a multiplicity of cell foils for storing electrical energy that are stacked on top of one another and at least one contact plate, wherein the cell foils form a foil stack in a connection portion, and the foil stack is connected to the contact plate by at least one weld seam for the electrical contacting of the cell foils via the contact plate; wherein the device is appropriately designed for carrying out the method as set forth in claim 1 and, for the purpose of producing the at least one weld seam, comprises at least one compaction device for compacting at least the foil stack, one vacuum device for generating a negative pressure at least in a connecting region of the foil stack and contact plate, and one laser device for connecting the foil stack to the contact plate in the connecting region via at least one weld seam produced using a laser welding process in the presence of the negative pressure.

* * * * *